(12) United States Patent
Takahashi et al.

(10) Patent No.: US 7,034,460 B2
(45) Date of Patent: Apr. 25, 2006

(54) HIGH PRESSURE DISCHARGE LAMP

(75) Inventors: Kiyoshi Takahashi, Kyoto (JP);
Shinichiro Hataoka, Osaka (JP);
Masahiro Yamamoto, Osaka (JP);
Takashi Tsutatani, Shiga (JP);
Tomoyuki Seki, Osaka (JP); Makoto Horiuchi, Nara (JP); Tsuyoshi Ichibakase, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 63 days.

(21) Appl. No.: 10/819,238

(22) Filed: Apr. 6, 2004

(65) Prior Publication Data

US 2004/0207327 A1    Oct. 21, 2004

(30) Foreign Application Priority Data

Apr. 16, 2003    (JP) ............................. 2003-111117

(51) Int. Cl.
*H01J 17/44*    (2006.01)
*H01J 17/20*    (2006.01)

(52) U.S. Cl. ...................................... 313/626; 313/332

(58) Field of Classification Search ........ 313/624–626, 313/634, 331–333
See application file for complete search history.

(56) References Cited

U.S. PATENT DOCUMENTS

| | | | | |
|---|---|---|---|---|
| 6,897,612 B1 * | 5/2005 | Horiuchi et al. | ............ | 313/625 |
| 2002/0021092 A1 * | 2/2002 | Seki et al. | .................. | 313/623 |

FOREIGN PATENT DOCUMENTS

| | | |
|---|---|---|
| JP | 08-087984 | 4/1996 |
| JP | 09-265947 | 10/1997 |

* cited by examiner

*Primary Examiner*—Ashok Patel
(74) *Attorney, Agent, or Firm*—Harness, Dickey & Pierce, P.L.C.

(57) ABSTRACT

A high pressure discharge lamp with a trigger wire wound around a side tube portion has the structure in which the side tube portion has a first glass portion extending from a luminous bulb and a second glass portion provided in at least a portion of the inside of the first glass portion, and in which the second glass portion contains at least one substance of Li, Na, and K of from 0.001 wt % to 1.0 wt % inclusive. This structure provides a high pressure discharge lamp operable with a drastically reduced starting voltage.

10 Claims, 13 Drawing Sheets

Compressive
stress remains

Longitudinal compression

Radial compression

HIGH PRESSURE DISCHARGE LAMP

BACKGROUND OF THE INVENTION

1. Field of the Invention

The present invention relates to high pressure discharge lamps used for general illumination or a light source of a projector. In particular, the present invention relates to high pressure discharge lamps operable with a reduced starting voltage.

2. Description of the Related Art

In recent years, image projection apparatuses such as a liquid crystal projector and a DMD™ (Digital Micromirror Device) projector have been commonly used as systems for realizing large-scale video images. For such an image projection apparatus, in general, an ultrahigh pressure mercury lamp having a high intensity has been commonly used among various high pressure discharge lamps.

Key factors in developing such a projection apparatus are the brightness, size, and weight of the apparatus, and projection apparatuses of a smaller size, a reduced weight and high brightness have been developed.

One of means for attaining a projection apparatus of a small size and a reduced weight is to reduce the starting voltage of a high pressure discharge lamp installed in the apparatus. If the starting voltage can be reduced, a lighting circuit for the lamp can be made small and lightweight with a reduced cost. Furthermore, if the starting voltage can be reduced, the safety against voltage is improved and simpler interconnect wires and connectors can be used, resulting in cost savings. Moreover, influences of the starting voltage on other electronic circuits, such as noises, can be reduced, which brings about the advantage that a possible occurrence of malfunction or failure decreases.

Against the foregoing backdrop, in order to reduce the starting voltage of the high pressure discharge lamp, a method has been generally known in which a trigger wire is wound around the lamp (for example, Japanese Unexamined Patent Publications No. 9-265947 and No. 8-87984). The invention described in each publication is the invention in which a modified method for setting up a trigger wire is provided to improve the demerits caused by setting up the trigger wire. Details on the invention will be described below.

In the invention described in Japanese Unexamined Patent Publication No. 9-265947, a horizontally mounted, DC (direct current)-operated metal halide lamp has the structure in which an end of a trigger wire is connected to a cathode and an intermediate portion of the trigger wire is disposed away from an outer wall of a luminous bulb. According to the description, this structure makes it possible to reduce damages by positive ions drawn toward the trigger wire to quartz forming the luminous bulb.

Japanese Unexamined Patent Publication No. 8-87984 describes a short arc type, DC-operated, mixed metal vapor discharge lamp which includes a bulb consisting of an expansion portion and a pair of branch tube portions. The lamp has the structure in which a trigger wire is connected at one end to a cathode side and stretched to dispose the other end thereof at a position 3 mm or more away from the bulb-rising end of the branch tube portion in an anode unit. According to the description, like Japanese Unexamined Patent Publications No. 9-265947, this structure makes it possible to reduce damages by positive ions drawn toward the trigger wire 7 to quartz forming a luminous bulb.

SUMMARY OF THE INVENTION

Recently, competition in development of a downsized projector has heated up. In order to accomplish further downsizing, reduction in the starting voltage of a lamp in the projector has been increasingly demanded. However, the approach of simply setting up a trigger wire in the high pressure discharge lamp cannot reduce the starting voltage sufficiently.

The present invention has been made in view of the foregoing problem, and its object is to provide a trigger wire-wound, high pressure discharge lamp operable with a reduced starting voltage.

A high pressure discharge lamp of the present invention comprises: a luminous bulb with a luminous substance enclosed therein; a side tube portion for retaining the airtightness of the luminous bulb; and a trigger wire wound around the side tube portion. The side tube portion includes a first glass portion extending from the luminous bulb and a second glass portion provided in at least a portion of the inside of the first glass portion. In the second glass portion, at least one selected from the group consisting of Li, Na, and K is contained in an amount of from 0.001 wt % to 1.0 wt % inclusive. Within the luminous bulb, a pair of electrodes are opposed to each other. Each of the pair of electrodes is electrically connected to a metal foil. The metal foil is embedded in the side tube portion and at least a portion of the metal foil is covered with the second glass portion. The side tube portion includes a portion to which a compressive stress is applied.

Preferably, when the side tube portion is measured by a sensitive color plate method utilizing the photoelastic effect, the compressive stress applied to a region of the lamp corresponding to the second glass portion is from 10 kgf/$cm^2$ to 50 kgf/$cm^2$ inclusive.

In one embodiment, a portion of the electrode is embedded in the side tube portion, and a coil made of metal is wound around at least part of the portion of the electrode embedded in the side tube portion.

In one embodiment, the side tube portion comprises a pair of side tube portions. The metal foil connected to each of the pair of electrodes is embedded in a corresponding one of the pair of side tube portions. The trigger wire includes first and second trigger wires. The first trigger wire is electrically connected to one of the electrodes and wound around the side tube portion within which the other of the electrodes is disposed. The second trigger wire is electrically connected to the said other electrode and wound around the side tube portion within which the said one electrode is disposed. Even if a conductive member is interposed between the trigger wire and the electrode, the fact that the trigger wire and the electrode are electrically connected to each other holds true.

Preferably, mercury as the luminous substance and bromine are enclosed within the luminous bulb, and the amount of the enclosed bromine is from $10^{-4}$ μmol/cm³ to 10 μmol/cm³ inclusive in terms of the internal volume of the luminous bulb.

Preferably, the first glass portion contains 99 wt % or more of $SiO_2$, and the second glass portion contains less than 99 wt % of $SiO_2$ and at least one of 15 wt % or less of $Al_2O_3$ and 4 wt % or less of $B_2O_3$.

The second glass portion has a lower softening point than the first glass portion.

In one embodiment, an end of the metal foil closer to the luminous bulb is etched.

In one embodiment, mercury is enclosed as the luminous substance, and the amount of the enclosed mercury is 160 mg/cm³ or more in terms of the internal volume of the luminous bulb.

In one embodiment, mercury is enclosed as the luminous substance, and the amount of the enclosed mercury is 300 mg/cm³ or more in terms of the internal volume of the luminous bulb.

DETAILED DESCRIPTION OF THE PREFERRED EMBODIMENTS

Figure 1:
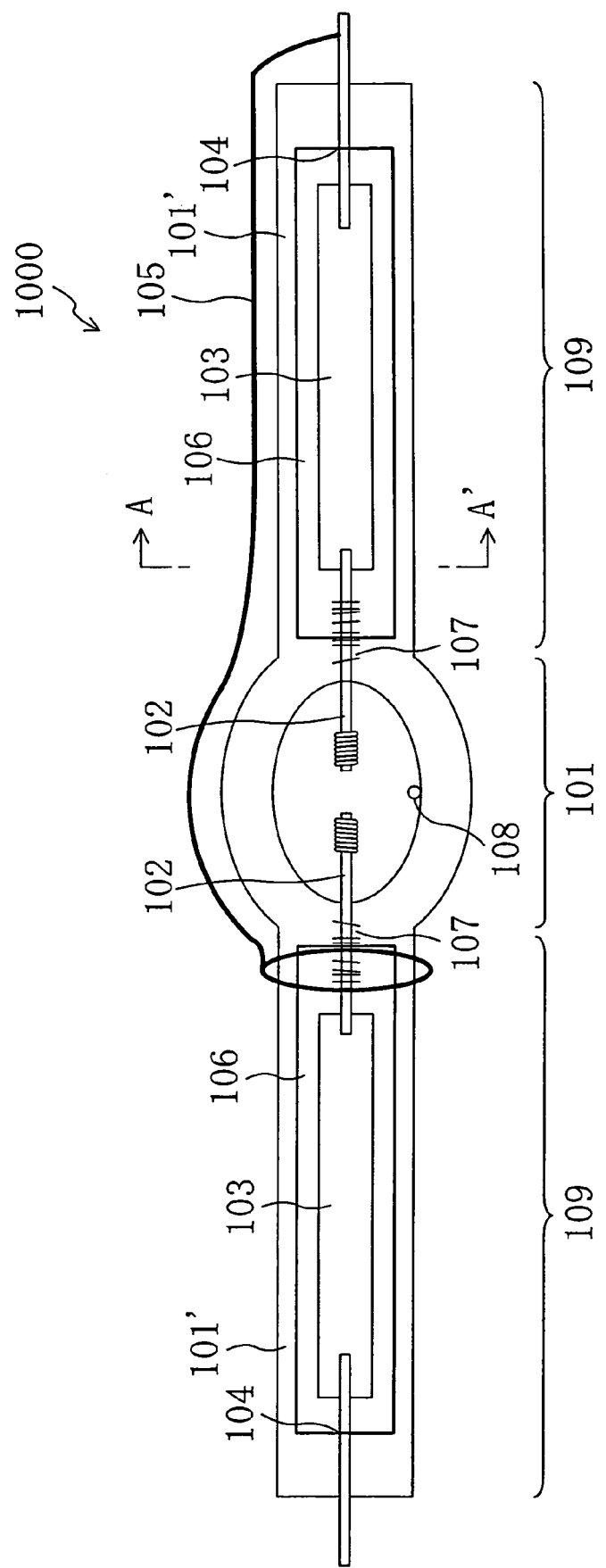
FIG. 1 is a schematic view showing a high pressure mercury lamp 1000 according to a first embodiment.

Hereinafter, embodiments of the present invention will be described with reference to the accompanying drawings. In the following drawings, for simplification of description, the elements having substantially the same function bear the same reference numeral. The present invention is not limited to the following embodiments.

(First Embodiment)

FIG. 1 is a schematic view showing a high pressure discharge lamp 1000 according to a first embodiment of the present invention. The high pressure discharge lamp 1000 includes a luminous bulb 101 with a luminous substance enclosed therein and side tube portions (also referring to as "sealing portions" in general) 109 for retaining the airtightness of the luminous bulb 101. The side tube portions 109 and 109 are present in a single pair, and they extend from both ends of the luminous bulb 101, respectively, and in the opposite direction from each other. Each of the side tube portions 109 includes a first glass portion 101' extending from the luminous bulb 101 and a second glass portion 106 provided in at least a portion of the inside of the first glass portion 101'. The first glass portion 101' contains 99 wt % or more of $SiO_2$. In the first embodiment, the first glass portion 101' is made of quartz glass. The center portion of the luminous bulb 101 has an outside diameter (a maximum diameter) of about 10 mm, an inside diameter of about 5 mm, and a glass thickness (a material thickness) of about 3 mm. The inside volume of the luminous bulb 101 is about 0.1 ml.

A pair of electrodes 102 and 102 are disposed within the luminous bulb 101. A portion of each of the electrodes 102 and 102 is embedded in the corresponding side tube portion 109. That is to say, a portion of the electrode 102 is surrounded with glass forming the side tube portion 109. The electrode 102 is made of tungsten. The distance between the tips of the electrodes 102 and 102 is about 1.0 mm. Note that the distance between the electrodes is selected from about 0.8 to 1.5 mm as appropriate for the application of the high pressure discharge lamp used.

Figure 8:
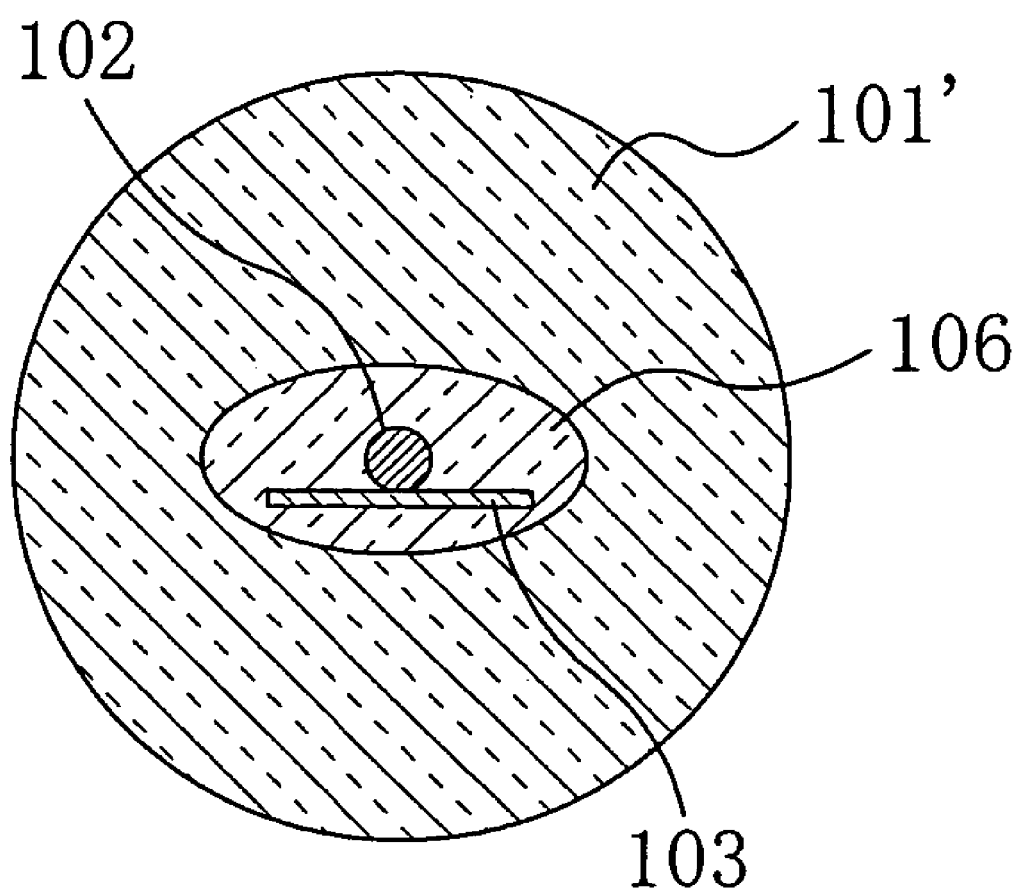
FIG. 8 is a sectional view taken along the line A–A' of FIG. 1.

To the end of the electrode 102 different from the end located within the luminous bulb 101, a metal foil 103 is electrically connected (welded). The metal foil 103 is embedded in the side tube portion 109. To be more specific, glass forming the side tube portion 109 surrounds the metal foil 103 to enclose the foil. In other words, the entire surface of the metal foil 103 tightly adheres to glass forming the side tube portion 109. In the first embodiment, the entire surface of the metal foil 103 is covered with the second glass portion 106. The second glass portion 106 tightly adheres to the metal foil 103, thereby retaining the airtightness of the luminous bulb 101. However, it is sufficient that at least part of the metal foil 103 is covered with the second glass portion 106. Specifically, as shown in FIG. 8, the second glass portion 106 covers the entire perimeter of the metal foil 103 when viewed in the transverse cross section of the side tube portion 109 (the cross section of the side tube portion 109 perpendicularly intersecting the longitudinal direction thereof). In other words, the second glass portion 106 covers the entire widthwise perimeter of at least a portion of the metal foil 103. In this portion, the edges of the metal foil 103 are surrounded with the second glass portion 106, thereby retaining a sufficient airtightness.

Glass forming the second glass portion 106 contains less than 99 wt % of $SiO_2$ and at least one of 15 wt % or less of $Al_2O_3$ and 4 wt % or less of $B_2O_3$, and at least one element selected from the group consisting of Li, Na, and K is further added to the glass. The total amount of the added element or elements is 1 wt % or less. When $Al_2O_3$ or $B_2O_3$ is added to $SiO_2$, the glass softening point is decreased. Therefore, the softening point of the second glass portion 106 is lower than that of the first glass portion 101'. In the first embodiment, Vycor glass (the registered trademark No. 1657152 in Japan) was employed as glass forming the second glass portion 106. Vycor glass is a material obtained by mixing additives in quartz glass. Since the softening point of Vycor glass is lower than that of quartz glass, Vycor glass has an improved processability over quartz glass. An exemplary composition of Vycor glass is as follows: 96.5% of $SiO_2$; 0.5% of $Al_2O_3$; and 3% of $B_2O_3$. In addition, the Vycor glass contains a small amount of $Na_2O$, whose percentage is 0.04%. In the first embodiment, the softening point and the strain point of the first glass portion are 1680° C. and 1120° C., respectively, and the softening point and the strain point of the second glass portion (Vycor glass) are 1530° C. and 890° C., respectively.

In the first embodiment, the side tube portion 109 has a portion to which a compressive stress is applied. This portion corresponds to the second glass portion 106. The second glass portion 106 is located in the center of the side tube portion 109, and the outer circumference of the second glass portion 106 is covered with the first glass portion 101'.

The high pressure discharge lamp 1000 of the first embodiment is measured regarding strain by a sensitive color plate method utilizing the photoelastic effect. When the side tube portion 109 is observed in this measurement, it is confirmed that a compressive stress is present in a portion corresponding to the second glass portion 106. During this observation, the object to be observed is viewed from the perpendicular direction to the direction in which the side tube portion 109 extends (the longitudinal direction), that is, from the lateral direction. In the strain measurement by the sensitive color plate method, strain (stress) within the internal portion of the cross section made by cutting the side tube portion 109 crosswise cannot be observed while the shape of the high pressure discharge lamp 1000 is kept. However, the fact that a compressive stress is observed in the portion corresponding to the second glass portion 106 means that a compressive stress is applied to a portion of the side tube portion 109 in one of the following states or a combination thereof a compressive stress is applied to the entire or the major portion of the second glass portion 106; a compressive stress is applied to the boundary portion between the second glass portion 106 and the first glass portion 101'; a compressive stress is applied to a portion of the second glass portion 106 closer to the first glass portion 101'; and a compressive stress is applied to a portion of the first glass portion 101' closer to the second glass portion 106. In this measurement, a stress (or strain) that is compressive in the longitudinal direction of the side tube portion 109 is monitored in the form of an integrated value.

In the first embodiment, Vycor glass is used as glass forming the second glass portion 106. Alternatively, use may be made of glass containing 62 wt % of $SiO_2$, 13.8 wt % of $Al_2O_3$, and 23.7 wt % of CuO.

The compressive stress applied to a portion of the side tube portion 109 can be substantially beyond zero (i.e., 0 $kgf/cm^2$). The value of this stress is obtained in the state in which the high pressure discharge lamp does not operate. The presence of the compressive stress can improve the strength against vapor pressure as compared to the conventional structure. It is preferable that the compressive stress be about 10 $kgf/cm^2$ or more (about $9.8 \times 10^5$ $N/m^2$ or more). Also, it is preferable that the compressive stress be about 50 $kgf/cm^2$ or less (about $4.9 \times 10^6$ $N/m^2$ or less). When it is less than 10 $kgf/cm^2$, the compressive strain is so weak that the strength of the lamp against vapor pressure may not be increased sufficiently. Moreover, there is no practical glass material that can realize a structure having a compressive stress higher than about 50 $kgf/cm^2$. However, a compressive stress of less than 10 $kgf/cm^2$ can increase the strength against vapor pressure as compared to the conventional structure as long as it exceeds substantially zero. If a practical material that can realize a structure having a compressive stress of more than 50 $kgf/cm^2$ is developed, the second glass portion 106 can have a compressive stress of more than 50 $kgf/cm^2$.

From the results obtained by monitoring the high pressure discharge lamp 1000 with a strain detector, it seems that a strain boundary region caused by a difference in compressive stress between the first glass portion 101' and the second glass portion 106 is present in the vicinity of the boundary between the two glass portions. This probably means that the compressive stress is present exclusively in the second glass portion 106 (or an area near the outer circumference of the second glass portion 106), and the compressive stress of the second glass portion 106 is not transmitted very much (or is hardly transmitted) to the entire first glass portion 101'. The difference in the compressive stress between the first glass portion 101' and the second glass portion 106 can be in the range, for example, from about 10 $kgf/cm^2$ to about 50 $kgf/cm^2$.

In the first embodiment, a measuring device for quantifying a strain is a strain detector (SVP-200 manufactured by Toshiba Corporation). When this strain detector is used, the magnitude of compressive strain generated in the side tube portion 109 can be obtained as an average of the stress applied to the side tube portion 109.

The principle of the strain measurement by the sensitive color plate method utilizing the photoelastic effect will be described briefly with reference to FIG. 9. FIGS. 9A and 9B are schematic views showing the state in which linearly polarized light obtained by transmitting light through a polarizing plate is incident to glass. Herein, when the linearly polarized light that is incident is represented as u, u can be regarded as being obtained by synthesizing two linearly polarized lights u1 and u2 perpendicularly intersecting each other.

Figure 9A:
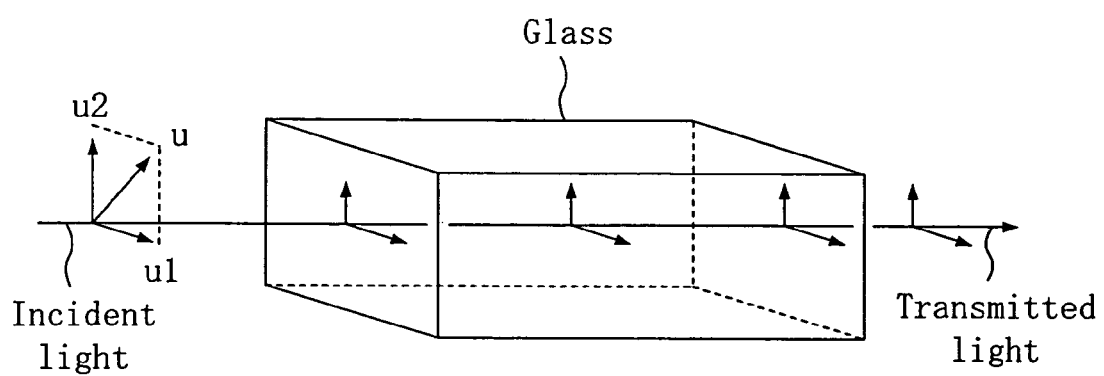
FIGS. 9A and 9B are drawings for explaining the principle of measurement of strain by a sensitive color plate method utilizing a photoelastic effect.
Figure 9B:
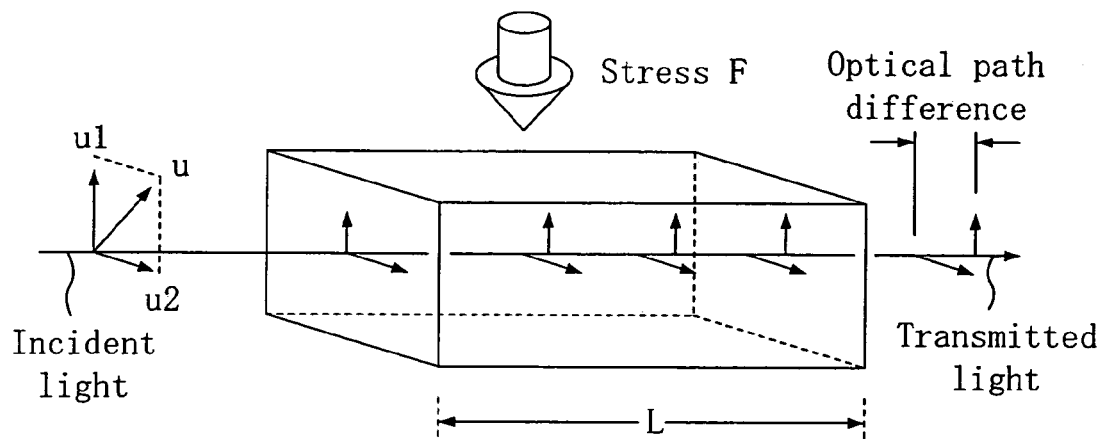

As shown in FIG. 9A, if there is no strain in the glass, u1 and u2 are transmitted through it at the same speed, after which no displacement occurs between the transmitted u1 and u2. On the other hand, as shown in FIG. 9B, if there is a strain in the glass and a stress F is applied thereto, u1 and u2 are transmitted through it at different speeds, after which a displacement occurs between the transmitted u1 and u2. In other words, one of u1 and u2 is later than the other. The distance of this difference made by being late is referred to as an optical path difference. Since the optical path difference R is proportional to the stress F and the distance L of light transmission through the glass, the optical path difference R can be expressed as $$R = C \cdot F \cdot L$$

where C is a proportional constant. The unit of each letter is as follows: R (nm); F (kgf/cm$^2$); L (cm); and C ({nm/cm}/{kgf/cm$^2$}). C is referred to as "photoelastic constant" and depends on the materials used such as glass. As seen from the above equation, if C is known, L and R can be measured to obtain F.

The inventors measured the distance L of light transmission through the side tube portion 109, that is, the outer diameter L of the side tube portion 109, and obtained the optical path difference R by observing the color of the side tube portion 109 with a strain standard during the measurement. The photoelastic constant of quartz glass, which is 3.5, was used as the photoelastic constant C. These values were substituted in the above equation to calculate the stress value, and the compressive strain in the longitudinal direction of the metal foil 103 was quantified with the calculated stress value.

In this measurement, stress in the longitudinal direction (the direction in which the axis of the electrode 102 extends) of the side tube portion 109 was observed, but this does not mean that there is no compressive stress in other directions. In order to determine whether or not a compressive stress is present in the radial direction (the direction from the central axis toward the outer circumference, or the opposite direction) or the circumferential direction (e.g., the clockwise direction) of the side tube portion 109, it is necessary to cut the luminous bulb 101 or the side tube portion 109. However, as soon as such cutting is performed, the compressive stress in the second glass portion 106 is released. Therefore, only the compressive stress in the longitudinal direction of the side tube portion 109 can be measured without cutting the lamp 1000. Consequently, the inventors quantified the compressive stress at least in this direction.

In the lamp 1000 of the first embodiment, a compressive strain (at least a compressive strain in the longitudinal direction) is present in the second glass portion 106 provided in at least a portion of the inside of the first glass portion 101', so that the strength against vapor pressure of the high pressure discharge lamp 1000 can be improved. In other words, the lamp of the first embodiment can have a higher strength against vapor pressure than the lamp with no compressive strain present in the second glass portion 106. The lamp 1000 of the first embodiment shown in FIG. 1 can operate at an operating pressure of 30 MPa (corresponding to an amount of enclosed mercury of 300 mg/cm$^3$) or more, which is more than a highest level of the conventional lamps of about 20 MPa (an amount of enclosed mercury of 200 mg/cm$^3$). If the amount of mercury to be enclosed can be increased to more than 300 mg/cm$^3$, the width (thickness) of an arc is decreased. Therefore, the brightness of the arc can be remarkably increased.

The metal foil 103 is made of molybdenum. Although not shown, a tip of the metal foil 103 closer to the luminous bulb 101 is subjected to etching treatment. The etching treatment is performed by immersing the metal foil 103 in an alkaline solution such as NaOH and passing current through the metal foil 103 to melt the tip of the metal foil 103, thereby removing burrs on it. The shorter side of the tip of the metal foil 103 closer to the luminous bulb 101 has a wedge-shaped cross section (the cross-sectional shape made by dulling the angle of a rhombus). Use of the metal foil 103 thus subjected to the etching treatment makes it possible to improve the resistance of the lamp against internal vapor pressure as compared to the lamp with the metal foil 103 subjected to no etching treatment.

An external lead 104 is electrically connected (welded) to the side of the metal foil 103 opposite to the side thereof connected to the electrode 102. The external lead 104 is made of molybdenum.

Around the portion of the electrode 102 embedded in the side tube portion 109, a coil 107 of tungsten is wound. In the first embodiment, the coil 107 has a wire diameter of 0.06 mm. The wire diameter of the coil 107 is not limited to 0.06 mm, and it is appropriately selected from of 0.01 to 0.3 mm. It is sufficient that the coil 107 is wound around at least part of the portion of the electrode 102 embedded in the side tube portion 109, and it is acceptable that the coil 107 is present within the luminous bulb 101. However, if the coil 107 is present within the luminous bulb 101, discharge caused from the coil 107 occurs easily at the basal portion of the electrode 102 inside the luminous bulb 101 at the start of the lamp operation. Thus, it is preferable that the coil 107 be not exposed to the inside of the luminous bulb 101.

Bromine (not shown), rare gas (for example, argon), and mercury 108 as luminous substance are enclosed within the luminous bulb 101. Bromine is enclosed in order to prevent the blackening of the luminous bulb 101 and the amount of the enclosed bromine is about 10$^{-1}$ μmol/cm$^3$ in terms of the internal volume of the luminous bulb 101. Rare gas (argon) is enclosed to have a partial pressure of 0.03 MPa at 25° C. Mercury is enclosed in an amount of 300 mg/cm$^3$ represented in terms of the internal volume of the luminous bulb 101. Note that another type of halogen other than bromine, such as iodine, may be enclosed within the luminous bulb 101. Since the most suitable amount of halogen to be enclosed, however, varies depending upon its type, an appropriately adjusted amount may be enclosed. The amount of mercury to be enclosed need only be in the range of 160 to 400 mg/cm$^3$ in terms of the internal volume of the luminous bulb 101, but the lamp of the first embodiment can enclose mercury of 600 mg/cm$^3$ (corresponding to 600 MPa) at the maximum. An amount of mercury to be enclosed of 160 mg/cm$^3$ or more is preferable for a high pressure discharge lamp, and an amount of 300 mg/cm$^3$ or more is more preferable because such an amount can further enhance the brightness of the lamp. In addition, it is sufficient that as rare gas to be enclosed, at least one gas is selected from argon, xenon, neon, and krypton and that the selected gas is enclosed to have a partial pressure of 0.001 to 0.1 MPa at 20° C.

For reference, a brief description will be made of a method for fabricating a high pressure discharge lamp with a second glass portion.

While an electrode structure including the electrode 102, the metal foil 103, and the external lead 104 is put in a tube of Vycor glass forming the second glass portion 106, the tube is inserted into a bulb of quartz glass forming the luminous bulb 101 and the first glass portion 101'. With the pressure inside the luminous bulb 101 reduced, the first glass portion 101' is heated with a heating means such as a burner. Then, the first glass portion 101' and the second glass portion 106 are softened to seal the portion at which the metal foil 103 is present. As a result, the structure is completed in which the second glass portion 106 exists between the electrode 102 and the first glass portion 101'.

Next description will be made of the mechanism by which a compressive stress is applied to the second glass portion 106.

Generally, if there is a difference in the thermal expansion coefficient between materials that are in contact with each other, a compressive stress (compressive strain) is present in many cases. In other words, the reason why a compressive stress is applied to the second glass portion 106 that is provided within the side tube portion 109 is that in general there is a difference in the thermal expansion coefficient between the two materials that are in contact with each other. However, in the case of the first embodiment, in reality, there is no large difference in the thermal expansion coefficient between the two materials, and they are substantially equal. More specifically, the thermal expansion coefficients of tungsten and molybdenum, which are metals used for the electrode 102 and the metal foil 103, are about $46 \times 10^{-7}/°$ C. and about 37 to $53 \times 10^{-7}/°$ C., respectively. The thermal expansion coefficient of quartz glass forming the first glass portion 101' is about $5.5 \times 10^{-7}/°$ C., and the thermal expansion coefficient of Vycor glass forming the second glass portion 106 is about $7 \times 10^{-7}/°$ C., which is considered to be the same level as that of quartz glass. It does not seem possible that such a small difference in the thermal expansion coefficient causes a compressive stress of about 10 kgf/cm$^2$ or more between them. The characteristic difference between the two portions lies in the softening point or the strain point rather than the thermal expansion coefficient. When this aspect is focused on, the following mechanism may explain why a compressive stress is applied. The softening point and the strain point of quartz glass are 1650° C. and 1070° C., respectively (annealing point is 1150° C.). The softening point and the strain point of Vycor glass are 1530° C. and 890° C., respectively (annealing point is 1020° C.).

When the first glass portion 101' (the side tube portion 109) is shrunk by heating from the outside thereof in the sealing process of the high pressure discharge lamp 1000, a gap initially left between the first glass portion 101' and the second glass portion 106 is filled in so that the two portions are in tight contact with each other. After shrinking, there is a point of time when the second glass portion 106 that is positioned in an inner portion than the first glass portion 101' and has a lower softening point is still softened (still in the molten state) even though at that time the first glass portion 101' having a higher softening point and a larger area in contact with the air has been relieved from the softened state (that is, even when it has been solidified). The second glass portion 106 in this point of time has more flowability than the first glass portion 101', so that even if the thermal expansion coefficients of the two portions are substantially the same in the regular state (at the time when they are not softened), it can be considered that the properties (e.g., elastic modulus, viscosity, density or the like) of the two portions at this point of time are significantly different. Then, time passes further, and the second glass portion 106 that had flowability is cooled. Thus, when the temperature of the second glass portion 106 becomes lower than the softening point, the second glass portion 106 is also solidified like the first glass portion 101'. If the first glass portion 101' and the second glass portion 106 have the same softening point, the two glass portions may be cooled gradually from the outside and solidified without letting a compressive strain remain. However, in the structure of the first embodiment, the following mechanism is considered. The first glass portion 101' that is in the outer position is solidified earlier and then some time later, the second glass portion 106 that is in the inner position is solidified. As a result, a compressive strain remains in the second glass portion 106 that is in the inner position.

Figure 10A:
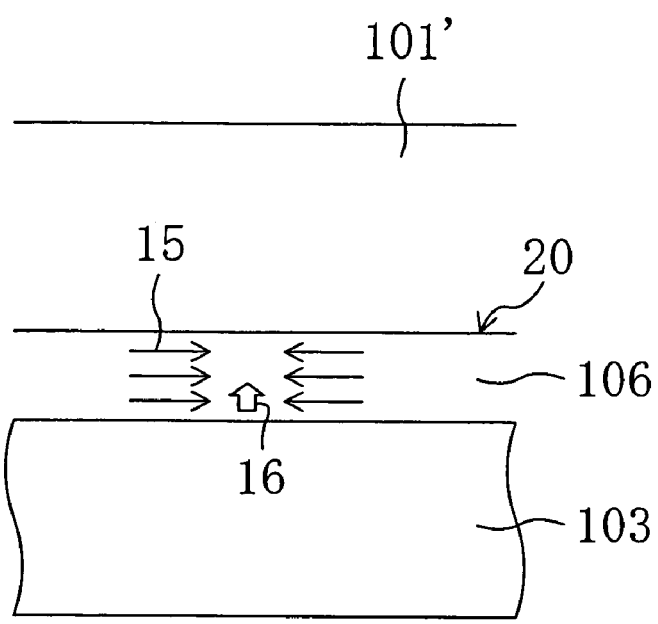
FIGS. 10A and 10B are enlarged views of the principal part of the lamp 1000 for explaining the reason why the strength of the lamp 1000 against vapor pressure is increased by a compressive strain occurring in a second glass portion.
Figure 10B:
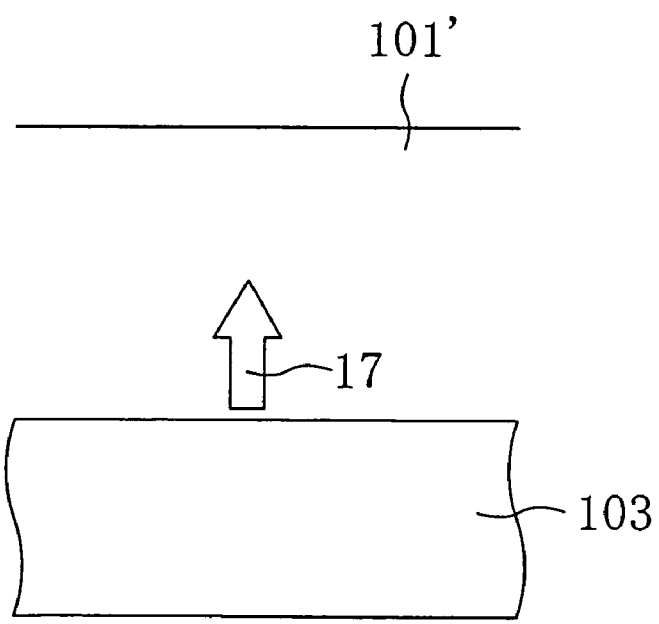

Next, the reason why the strength of the lamp 1000 against vapor pressure is increased by the compressive strain in the second glass portion 106 will be described with reference to FIG. 10. FIG. 10A is an enlarged view of the principal part of the side tube portion 109 of the lamp 1000 according to the first embodiment, and FIG. 10B is an enlarged view, for purposes of comparison, of the principal part of the side tube portion 109 without the second glass portion and only with the first glass portion 101'.

There are still unclear aspects as to the mechanism that increases the strength of the lamp 1000 against vapor pressure, but the inventors have inferred as follows.

First, the premise is that the metal foil 103 in the side tube portion 109 is heated and expanded during lamp operation, so that a stress from the metal foil 103 is applied to the glass portion of the side tube portion 109. More specifically, in addition to the fact that the thermal expansion coefficient of metal is larger than that of glass, the metal foil 103 which is thermally connected to the electrode 102 and through which current is transmitted is heated more readily than the glass portion of the side tube portion 109. Therefore, stress is applied more readily from the metal foil 103 (in particular, from the side surface of the foil whose area is small) to the glass portion.

As shown in FIG. 10A, it seems that when a compressive stress 15 is applied in the longitudinal direction of the second glass portion 106 (the portion 20 to which the compressive stress is applied), the occurrence of a stress 16 from the metal foil 103 can be suppressed. In other words, it seems that the compressive stress 15 of the second glass portion 106 can suppress the occurrence of the large stress 16 from the metal foil 103. As a result, this reduces, for example, generation of cracks in the glass portion of the side tube portion 109 and the occurrence of leakage (separation)

between the glass portion of the side tube portion 109 and the metal foil 103, so that the strength of the side tube portion 109 can be improved.

On the other hand, as shown in FIG. 10B, in the case of the structure not provided with the second glass portion 106, it seems that a stress 17 from the metal foil 103 is larger than in the case of the structure shown in FIG. 10A. In other words, it seems that since there is no region to which a compressive stress is applied in the surroundings of the metal foil 103, the stress 17 from the metal foil 103 becomes larger than the stress 16 shown in FIG. 10A. Therefore, it is inferred that the structure shown in FIG. 10A can increase the strength against vapor pressure more than the structure shown in FIG. 10B. This inference is compatible with a general nature of glass in which when a tensile strain (tensile stress) is present in glass, then the glass is easily broken, and when a compressive strain (compressive stress) is present in glass, then the glass is hardly broken.

However, from the general nature of glass in which the presence of a compressive stress in glass makes the glass less breakable, it cannot be inferred that the side tube portion 109 of the lamp 1000 has a high strength against vapor pressure. This is because of the following possible inference. Even if the strength of the glass in a region having a compressive strain is increased, a load is assumed to be generated in the side tube portion 109, taken altogether, as compared to the case where there is no strain. The load would in turn reduce the strength of the side tube portion 109 as a whole. However, it was not found until the inventors sampled and studied the lamp 1000 that the strength of the lamp 1000 against vapor pressure was improved, which could not be derived from only a theory. If a compressive stress larger than necessary remains in the second glass portion 106 (or the vicinity of the outer circumference thereof), the side tube portion 109 may actually be damaged during lamp operation and the life of the lamp may be shortened on the contrary. In view of these, the structure of the lamp 1000 having the second glass portion 106 probably exhibits a high strength against vapor pressure under a superb balance between various conditions. Inferring from the fact that the stress and strain of the second glass portion 106 are released when a portion of the luminous bulb 101 is cut, a load due to the stress and strain of the second glass portion 106 may be well received by the entire luminous bulb 101.

It is also inferred that the structure exhibiting a higher strength against vapor pressure is brought about by a portion 20 of the side tube portion 109 to which is applied a compressive stress generated by the difference in the compressive strain between the first glass portion 101' and the second glass portion 106. More specifically, the following inference is possible. There is substantially no compressive strain in the first glass portion 101' and a compressive strain is well confined into a region of only the second glass portion 106 (or the vicinity of the outer circumference) positioned closer to the center than the portion 20 to which a compressive stress is applied. This would succeed in providing excellent vapor pressure resistance characteristics. As a result of the fact that stress values are shown discretely because of the principle of the strain measurement by the sensitive color plate method, the portion 20 to which a compressive stress is applied is distinctly shown in FIG. 10 or other drawings. However, even if actual stress values can be shown continuously, the stress values are believed to change drastically in the portion 20 to which a compressive stress is applied, and it seems that the portion 20 to which a compressive stress is applied can be defined by the region where the stress value changes drastically.

Furthermore, it was found that in order to apply a compressive stress of about 10 kgf/cm$^2$ or more to the second glass portion 106, it is necessary to heat the high pressure discharge lamp 1000 constructed by the above-described production method (a half-finished lamp assembly) at a higher temperature than the strain point of the second glass portion 106. In addition, it was also found that it is preferable to heat the lamp at 1030° C. for two hours or more. More specifically, the lamp 1000 having sealed can be placed in a furnace with 1030° C. and annealed (i.e., baked under vacuum or reduced pressure). The temperature of 1030° C. is only an example and any temperature that is higher than the strain point temperature of the second glass portion (Vycor glass) 106 can be used. That is to say, the heating temperature can be higher than the strain point temperature of Vycor glass of 890° C. A preferable range of temperatures is that larger than the strain point temperature of Vycor glass of 890° C. and lower than the strain point temperature of the first glass portion (quartz glass) 101' (strain point temperature of SiO$_2$ is 1070° C.), but some effects were seen at about 1080° C. or 1200° C. in the experiments conducted by the inventors in some cases.

For comparison, a high pressure discharge lamp that had not been annealed was measured by the sensitive color plate method. In the measurement, a compressive stress of about 10 kgf/cm$^2$ or more was not observed, although the second glass portion 106 was provided in the side tube portion 109 of the high pressure discharge lamp.

In the above description, an example in which the second glass portion 106 is formed of Vycor glass has been described. However, it was found that, even if the second glass portion 106 is formed of glass containing 62 wt % of SiO$_2$, 13.8 wt % of Al$_2$O$_3$, 23.7 wt % of CuO (product name: SCY2 manufactured by SEMCOM Corporation: Strain point of 520° C.), a state can be achieved in which a compressive stress is applied at least in the longitudinal direction thereof.

Next, the mechanism inferred by the inventors, i.e., the mechanism by which a compressive stress is applied to the second glass portion 106 of the lamp when annealing is performed on a lamp assembly at a predetermined temperature for a predetermined period of time or longer, will be described with reference to FIG. 11.

Figure 11A:
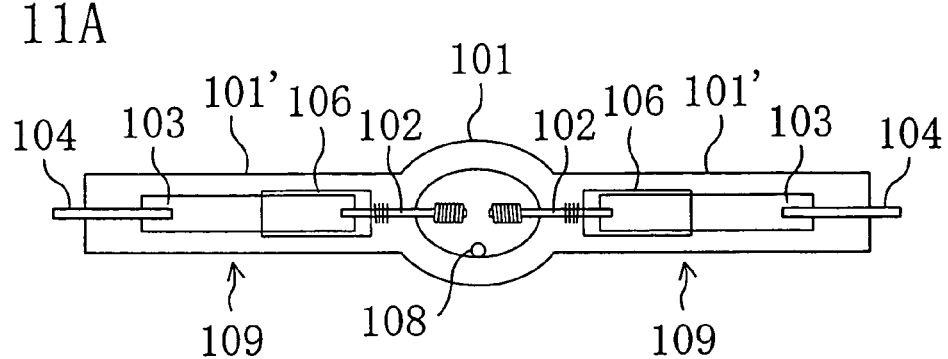
FIGS. 11A to 11D are sectional views for illustrating the mechanism by which compressive stress is applied by annealing.

First, as shown in FIG. 11A, a lamp assembly is prepared. The lamp assembly is produced in the manner as described above.

Figure 11B:
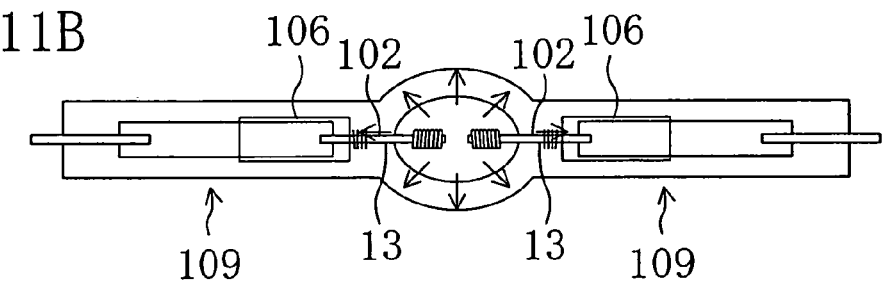

Next, when the lamp assembly is heated, as shown in FIG. 11B, mercury (Hg) 108 starts to evaporate, and as a result, a pressure is applied to the luminous bulb 101 and the second glass portion 106. The arrow in FIG. 11B indicates pressure (e.g., 100 atm or more) caused by the vapor of the mercury 108. The vapor pressure of the mercury 108 is applied not only to the inside of the luminous bulb 101 but also to the second glass portion 106 because there are gaps 13 that cannot recognized by human eyes in the sealed portion of the electrode 102.

The temperature for heating is further increased and heating continues at a temperature of more than the strain point of the second glass portion 106 (e.g., 1030° C.). Then, the vapor pressure of mercury is applied to the second glass portion 106 in the state where the second glass portion 106 is soft, so that a compressive stress is generated in the second glass portion 106. It is estimated that a compressive stress is generated, for example, in about four hours when heating is performed at the strain point, and in about 15 minutes when heating is performed at an annealing point. These times are derived from the definitions of the strain point and the annealing point. More specifically, the strain point refers to a temperature at which internal strain is substantially removed after four hour storage at that temperature. The annealing point refers to a temperature at which internal stress is substantially removed after 15 minute storage at that temperature. The above estimated periods of time are derived from these facts.

Figure 11C:
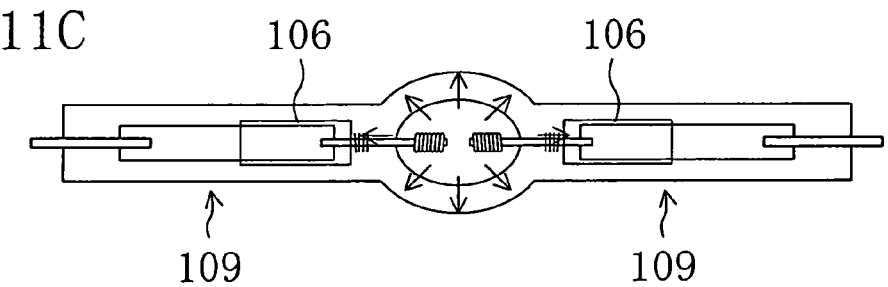
Figure 12A:
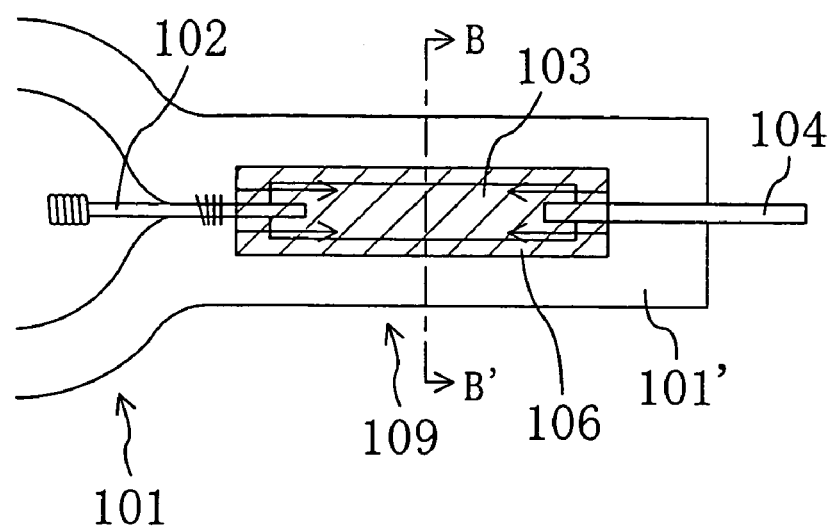
FIG. 12A is a schematic view showing a compressive stress in the longitudinal direction present in the second glass portion.
Figure 12B:
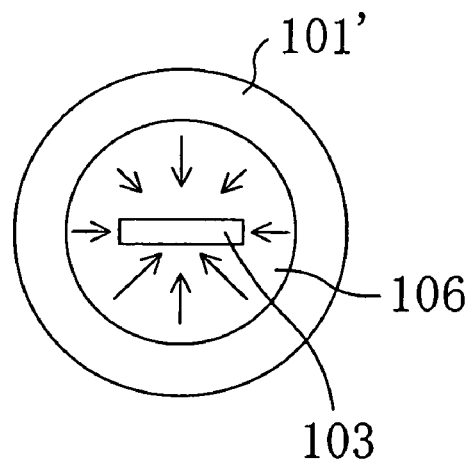
FIG. 12B is a sectional view taken along the line B–B' of FIG. 12A.

Next, heating is stopped, and the lamp assembly is cooled. Even after heating is stopped, as shown in FIG. 11C, the mercury continues to evaporate. Therefore, the temperature of the second glass portion 106 is decreased to a temperature lower than the strain point with the portion 106 under the pressure by the mercury vapor. Consequently, as shown in FIGS. 12A and 12B, not only a compressive stress in the longitudinal direction but also a compressive stress in the radial or other direction of the metal foil remain in the second glass portion 106 (however, only the longitudinal compressive stress can be observed with the strain detector).

Figure 11D:
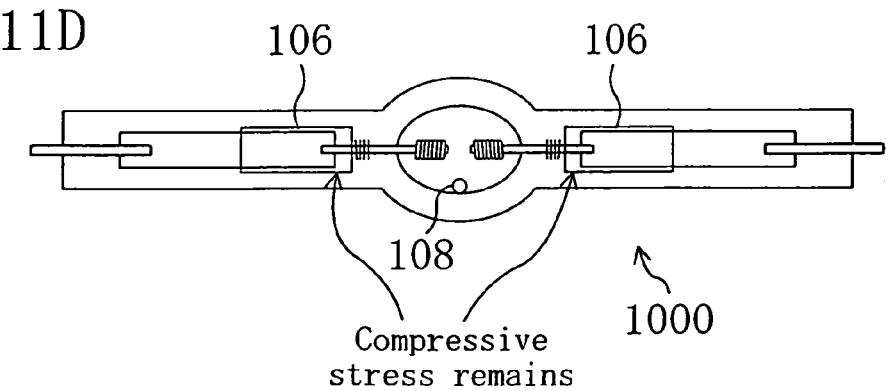

Finally, when cooling proceeds up to about room temperature, as shown in FIG. 11D, a lamp 1000 can be obtained in which a compressive stress of about 10 kgf/cm² or more is present in the second glass portion 106. Since, as shown in FIGS. 11B and 11C, the vapor pressure of the mercury is applied to both the second glass portions 106, this approach can reliably apply a compressive stress of about 10 kgf/cm² or more to both the side tube portions 109.

Figure 13:
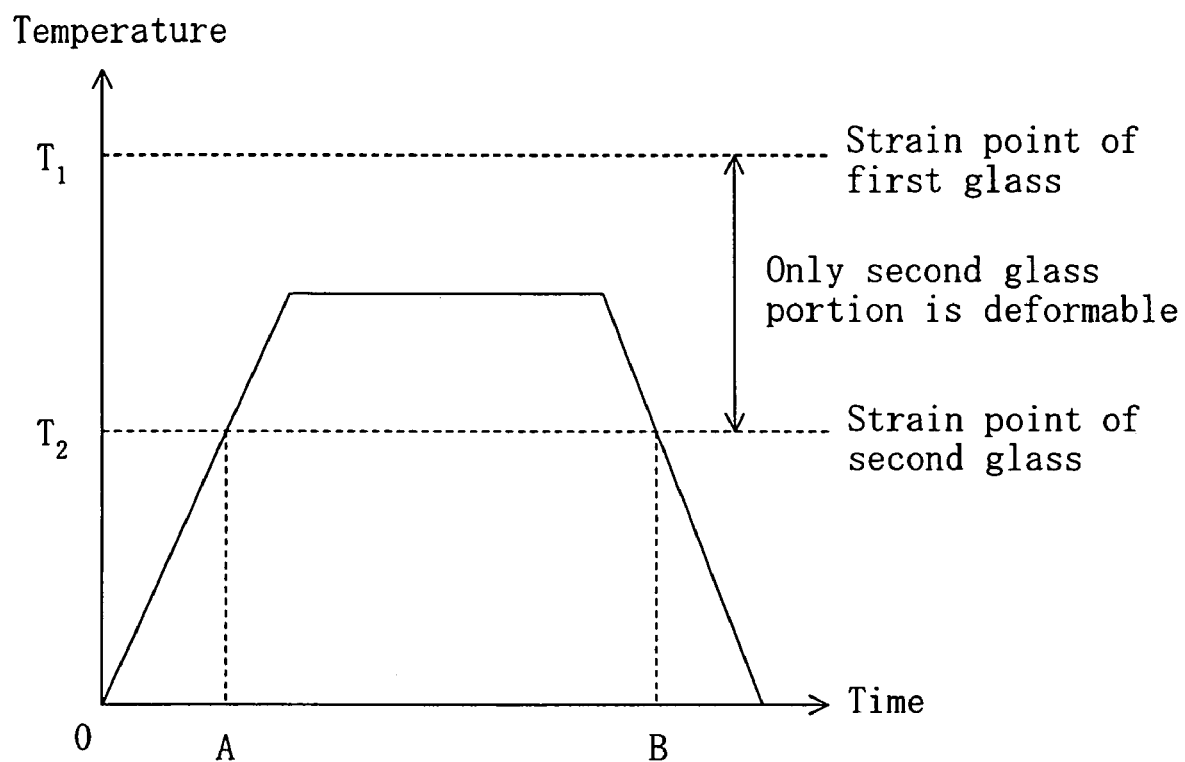
FIG. 13 is a graph schematically showing a profile of a heating process (annealing process).
Figure 14:
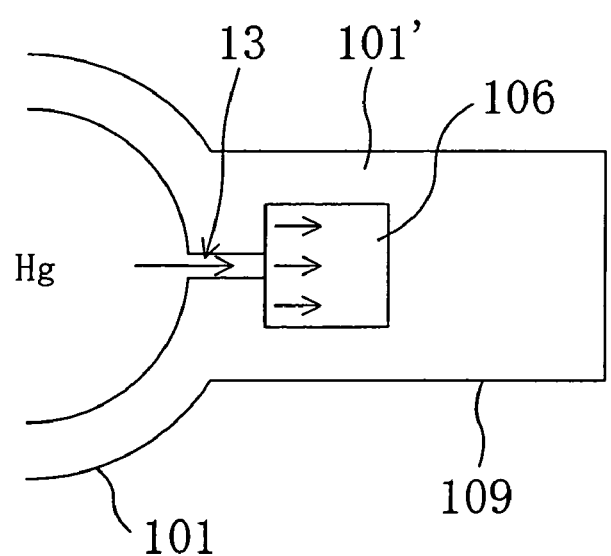
FIG. 14 is a schematic view for illustrating the mechanism by which compressive stress is generated in the second glass portion by mercury vapor.

FIG. 13 schematically shows the profile of this heating. First, heating is started (time O), and then the lamp temperature reaches the strain point ($T_2$) of the second glass portion 106 (time A). Then, the lamp is held at a temperature between the strain point ($T_2$) of the second glass portion 106 and the strain point ($T_1$) of the first glass portion 101' for a predetermined period of time. This temperature range can basically be regarded as a range in which only the second glass portion 106 can be deformed. During the hold time, as shown in a schematic view of FIG. 14, a compressive stress is generated in the second glass portion 106 by the mercury vapor pressure (e.g., 100 atm or more).

It seems that pressure application to the second glass portion 106 using the mercury vapor pressure is the most effective approach to utilize the annealing treatment. However, it can be inferred that if some force can be applied to the second glass portion 106, not only the mercury vapor pressure but also this force (e.g., pushing the external lead 104) can be used to apply a compressive stress to the second glass portion 106 as long as the lamp is held in a temperature range between $T_2$ and $T_1$ shown in FIG. 13.

Then, when heating is stopped, the lamp is gradually cooled and the temperature of the second glass portion 106 becomes lower than the strain point ($T_2$) after the passage of time B. When the temperature becomes lower than the strain point ($T_2$), the compressive stress in the second glass portion 106 remains. In this embodiment, after the lamp is held at 1030° C. for 150 hours, it is cooled (naturally cooled). Thus, a compressive stress is applied to and let to remain in the second glass portion 106.

Under the above-described mechanism, a compressive stress is generated by the mercury vapor pressure. Therefore, the magnitude of the compressive stress depends on the mercury vapor pressure (in other words, the amount of mercury enclosed).

In general, lamps tend to more readily be broken as the mercury amount is increased. However, if the sealing structure of the first embodiment is used, the compressive stress is increased with the increasing mercury amount and the vapor pressure resistance is thus improved. That is to say, with the structure of the first embodiment, a larger mercury amount realizes a higher vapor pressure resistance structure. This provides stable lamp operation at very high vapor pressure resistance that the existing techniques could not realize.

Next, a trigger wire 105 will be described.

The trigger wire 105 is electrically connected to the external lead 104. The trigger wire 105 is electrically connected to the electrode 102 via the external lead 104 and the metal foil 103. In other words, the trigger wire 105 is electrically connected to all of the electrode 102, the metal foil 103, and the external lead 104 arranged on the side to which the trigger wire 105 is electrically connected. The end of the trigger wire 105 different from the end thereof connected to the external lead 104 is wound around the side tube portion 109 within which part of the electrode 102 electrically connected to the trigger wire 105 is embedded. The trigger wire 105 is made of Kanthal (Fe alloy containing 22% of Cr and 5 to 6% of Al) and has a wire diameter of 0.3 mm. In order to resist heat generated by the high pressure discharge lamp 1000, the material of the trigger wire 105 is preferably Kanthal. The wire diameter thereof is preferably about 0.1 to 0.8 mm. This is because the trigger wire 105 with a wire diameter smaller than 0.1 mm may suffer corrosion by heat from the lamp before the lamp reaches its end of life. Moreover, the trigger wire 105 with a wire diameter greater than 0.8 mm is difficult to process, which is impractical.

Next, the result of a starting capability test of the high pressure discharge lamp according to the first embodiment will be shown.

Figure 2:
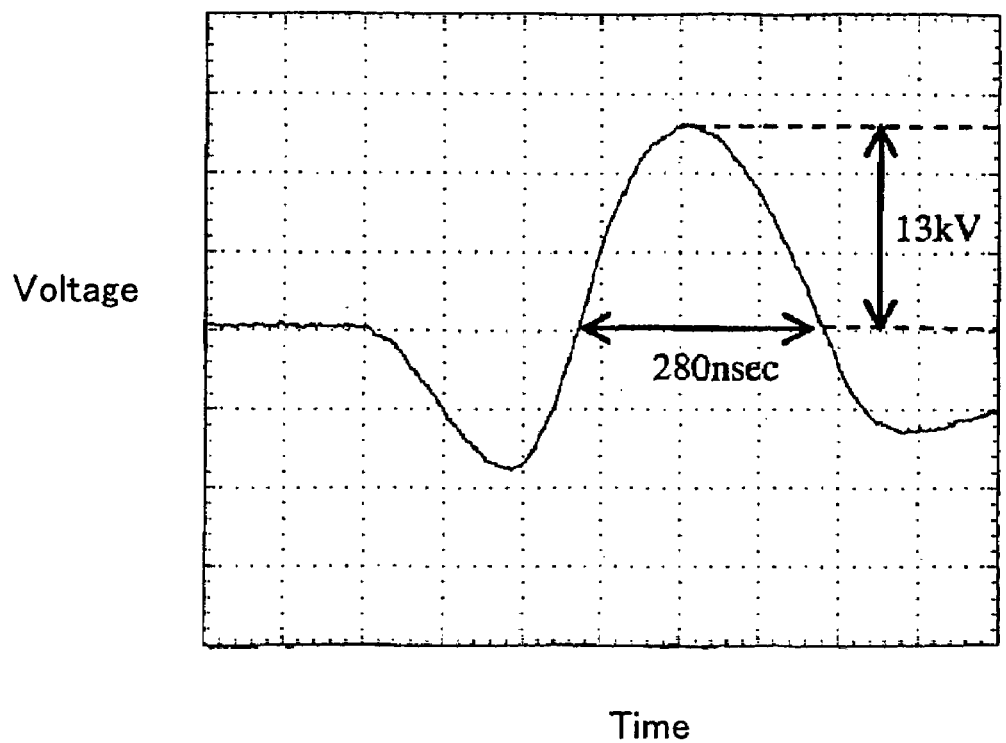
FIG. 2 is a wave form chart of a starting voltage pulse used for measuring the starting voltage.

In this test, the high pressure discharge lamp 1000 of the first embodiment was used, and its starting voltage was measured by starting the lamp with a lighting circuit capable of generating a starting pulse. The starting pulse used in this measurement has a waveform as shown in FIG. 2 and a peak voltage of about 13 kV. The pulse width represented by period of time is about 280 nsec at GND level.

Figure 3:
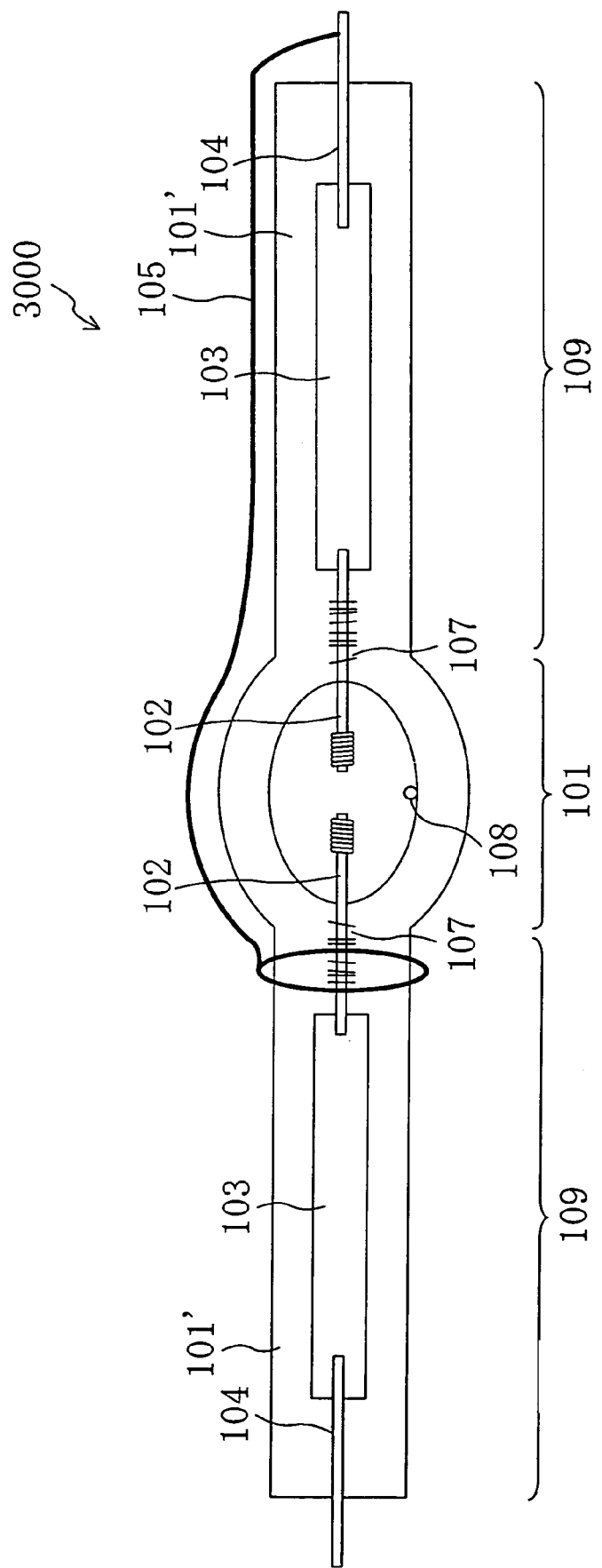
FIG. 3 is a schematic view showing a conventional high pressure mercury lamp 3000.

Herein, comparison was made with a high pressure discharge lamp 3000 having a conventional structure with no second glass portion. The conventional high pressure discharge lamp 3000 is schematically shown in FIG. 3. The high pressure discharge lamp 3000 shown in FIG. 3 differs from the high pressure discharge lamp 1000 shown in FIG. 1 only in that the second glass portion 106 is absent in the side tube portion 109. In the other points, the high pressure discharge lamp 3000 has the same lamp structure as the high pressure discharge lamp 1000. Therefore, the elements of the high pressure discharge lamp 3000 bear the same reference numerals as those of the high pressure discharge lamp 1000 and their descriptions will be omitted.

The starting capability test was conducted as follows.

The high pressure discharge lamps 1000 and 3000 were repeatedly turned on and off at cycles of ON-state for 3.5 hours at 160 W and OFF-state for 0.5 hours, and measured for the starting voltages after various burning hours. For each of the high pressure discharge lamps 1000 and 3000, ten lamps were monitored. Comparison was made between the lamps 1000 and 3000, each using the average value of the starting voltages of the ten lamps.

Figure 4:
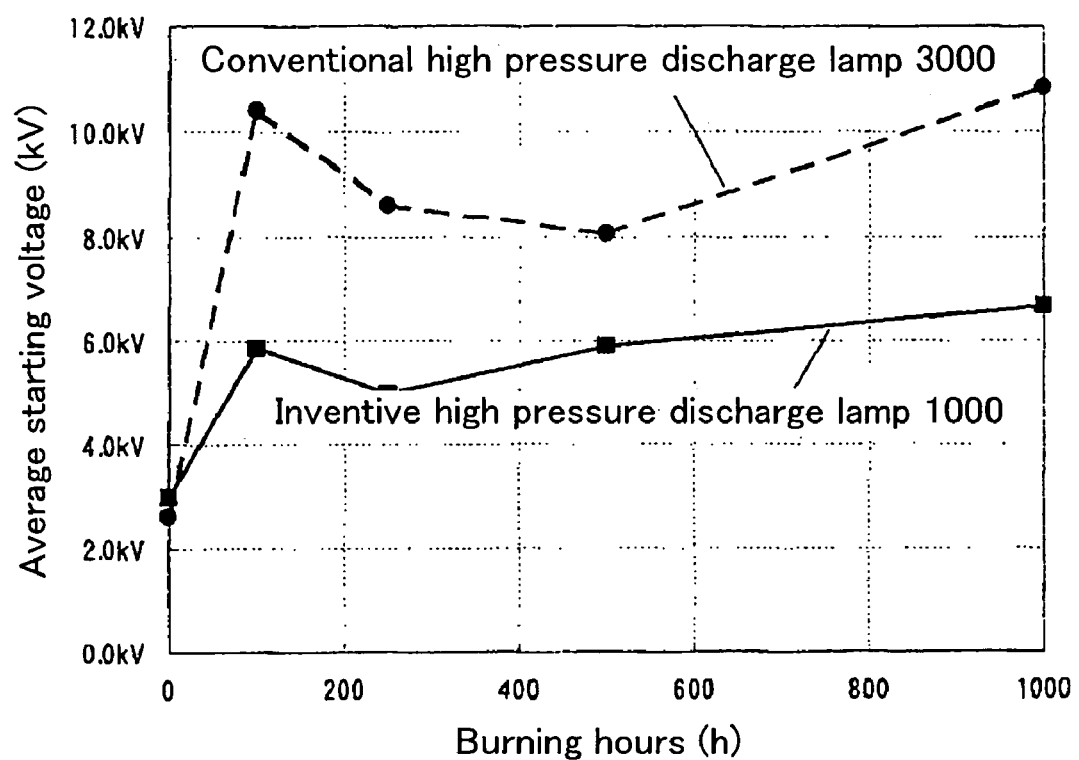
FIG. 4 is a graph showing the relation between the starting voltage and the burning time of the high pressure discharge lamp 1000.

The result of the starting voltage measurements is shown in FIG. 4. As seen from FIG. 4, the high pressure discharge lamp 1000 of the first embodiment has a much lower starting voltage after burning than the conventional high pressure discharge lamp 3000. For example, after 100 burning hours, the starting voltage of the lamp 1000 can be about 4.5 kV lower than that of the lamp 3000. Also after over 100 hours burning, the starting voltage of the lamp 1000 can be reduced by at least 2 kV (after 500 hours burning) as compared to that of the lamp 3000. This reduction in lamp starting voltage has a pronounced effect on the improvement of the safety against a high voltage applied from the lighting circuit and on the further simplification of the structure of an insulating member used in a lead-in line or the like to the high pressure discharge lamp 1000. This makes it possible to fabricate a lower-cost light source assembly (e.g., a projector). Moreover, the reduction in lamp starting voltage leads to reduction of noises affecting other electric circuits and reduction in the occurrence of malfunction.

Detail is uncertain on the reason why the high pressure discharge lamp 1000 of the first embodiment having such a structure largely reduces the starting voltage thereof. However, it is considered that some reaction occurs between a high voltage generated by the trigger wire 105 and Na contained in the second glass portion 106 to produce an action that assists the starting operation within the luminous bulb 101.

The above-mentioned remarkable and distinctive effect that Na present in the side tube portion 109 reduces the starting voltage of the lamp is a unique phenomenon caused by a combination of the trigger wire 105 and the structure in which the side tube portion 109 contains the second glass portion 106. This effect is a new finding that cannot be found from the extension of the conventional techniques.

In the first embodiment, the second glass portion 106 containing Na has been shown. However, if at least one selected from Li, Na, and K is present in the second glass portion 106, the same effect can be provided. Moreover, the total amount of Li, Na, and K contained in the second glass portion 106 is preferably from 0.001 wt % to 1.0 wt % inclusive. If this amount is less than 0.001 wt % (10 ppm), the effect of reducing the starting voltage of the lamp cannot be provided. If this amount is more than 1.0 wt %, the softening point of the second glass portion 106 becomes too low, which might cause devitrification of the glass. Moreover, in this case, the expansion coefficient of the second glass portion 106 varies widely as compared to the first glass portion 101', which decreases the sealing strength thereof. Thus, if 160 mg/cm$^3$ (corresponding to 160 MPa) of mercury is enclosed in the luminous bulb 101 in this case, the reliability of airtightness of the lamp might be impaired as is not preferable. If the amount of mercury enclosed is 160 mg/cm$^3$ or more, the fabricated lamp is preferable for a light source used for a projector or the like in combination with a reflecting mirror. Furthermore, when the distance between the tips of the electrodes is 2 mm or smaller, the fabricated lamp is more preferable for the light source of the projector.

It is preferable that the amount of bromine to be enclosed in the luminous bulb 101 be from $10^{-4}$ μmol/cm$^3$ to 10 μmol/cm$^3$ inclusive in terms of the internal volume of the luminous bulb 101. In the case of the high pressure discharge lamp containing halogen such as bromine in the luminous bulb 101, a correlation has been found to exist between the starting voltage thereof and the halogen amount. As the halogen amount is increased, the starting voltage rises. Therefore, it is preferable that the halogen amount to be enclosed be determined to match with the starting voltage of the lighting circuit. In addition, the rise in the starting voltage with the halogen amount differs in degree depending upon the type of halogen. Therefore, the amount of halogen to be enclosed may be changed according to the type of halogen. For example, provided that bromine is contained, in order to set the starting voltage at 10 kV or lower, the halogen amount should be about 10 μmol/cm$^3$ or less per unit internal volume of the luminous bulb 101. Bromine has the effect of suppressing the blackening of the luminous bulb 101 by generating halogen cycles within the luminous bulb 101 during burning. To suppress this blackening, bromine contained is preferably $10^{-4}$ μmol/cm$^3$ or more.

It is preferable that the coil 107 be wound around the portion of the electrode 102 embedded in the side tube portion 109, as in the case of the first embodiment. For comparison, using high pressure discharge lamps with no coil 107 wound therearound, their starting voltages were measured. In the case of the lamps with no coil 107, the average of starting voltages measured after 100 hours burning was about 0.5 kV higher than that in the case where the coil 107 is wound around. In the present invention, the difference in starting voltage of 0.5 kV is very significant. The reason for this significance is as follows. Aiming for a downsized lamp source assembly, users of the high pressure discharge lamp have strong demands for interconnect wires or other components with a withstand voltage as low as possible. The decrease in this starting voltage of 0.5 kV has the potential for achieving the downsizing of the assembly for those users.

The second glass portion 106 does not necessarily cover the entire surface of the metal foil 103. It may cover either a portion of the metal foil 103 closer to the luminous bulb 101, or a portion of the metal foil 103 connected to the electrode 102. From the viewpoint of the starting capability of the lamp, it is preferable that the trigger wire 105 be wound around the portion of the lamp located outside the second glass portion 106 (around the side tube portion 109).

It is confirmed that this structure can provide a lamp with a lower starting voltage. In order to improve the vapor pressure resistance of the high pressure discharge lamp 1000, the second glass portion 106 preferably covers at least a portion of the metal foil 103 closer to the luminous bulb 101.

In consideration of use of the lamp as a high pressure discharge lamp, the first glass portion 101' (including the luminous bulb 101) preferably contains 99% or more of $SiO_2$ in order to prevent devitrification or other troubles. The reason for this is as follows. If the $SiO_2$ content therein is decreased, the softening point of the first glass portion 101' is lowered. As a result, the potential for devitrification of the resulting first glass portion 101' is increased.

(Second Embodiment)

Figure 5:
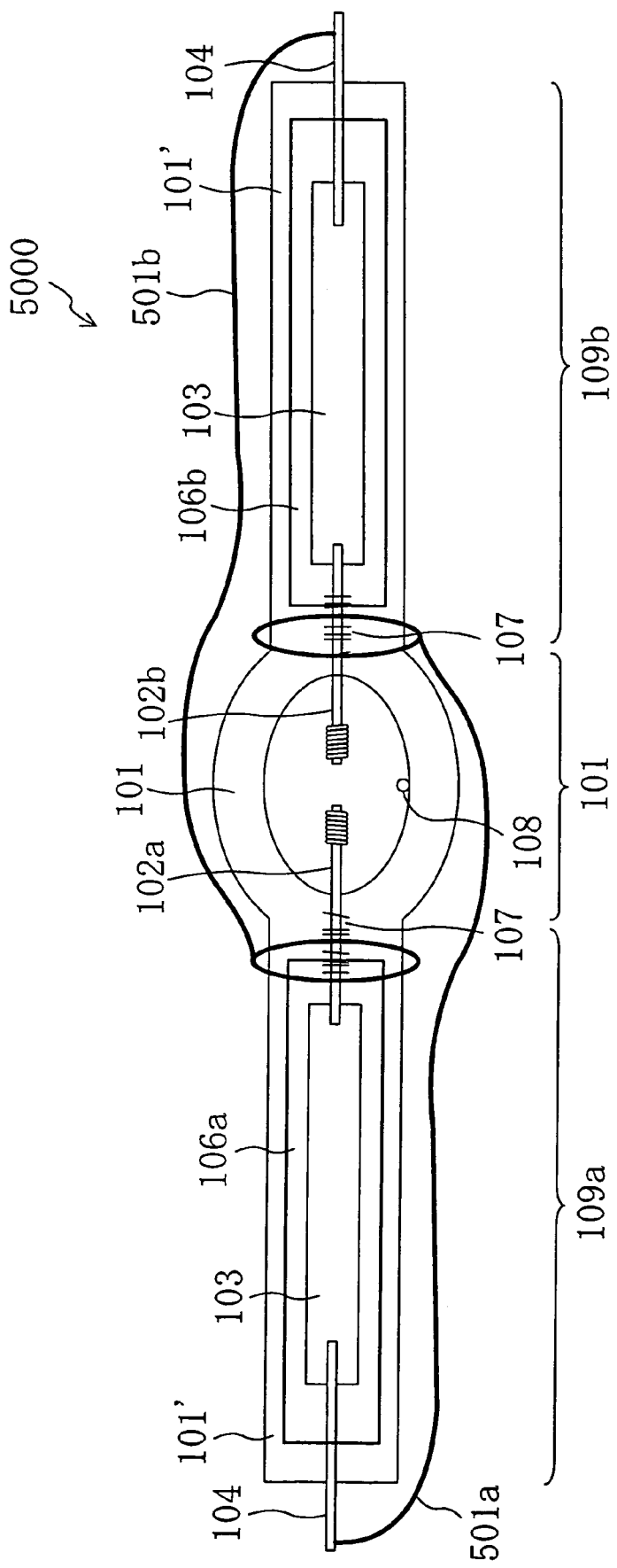
FIG. 5 is a schematic view showing a high pressure mercury lamp 5000 according to a second embodiment.

FIG. 5 is a schematic view of a high pressure discharge lamp 5000 according to a second embodiment. The high pressure discharge lamp 5000 differs from the high pressure discharge lamp 1000 of the first embodiment only in that two trigger wires 501a and 501b are present. In the other points, the high pressure discharge lamp 5000 has the same lamp structure as the high pressure discharge lamp 1000. Therefore, the elements of the high pressure discharge lamp 5000 bear the same reference numerals as those of the high pressure discharge lamp 1000 and their descriptions will be omitted.

A pair of electrodes 102a and 102b are opposed within the luminous bulb 101. The trigger wire 501a electrically connected to one electrode 102a (the left-handed electrode of this figure) is wound around a side tube portion 109b within which the other electrode 102b (the right-handed electrode of this figure) is disposed. The trigger wire 501b (a second trigger wire) electrically connected to the said other electrode 102b is wound around a side tube portion 109a within which the said one electrode 102a is disposed.

Figure 6:
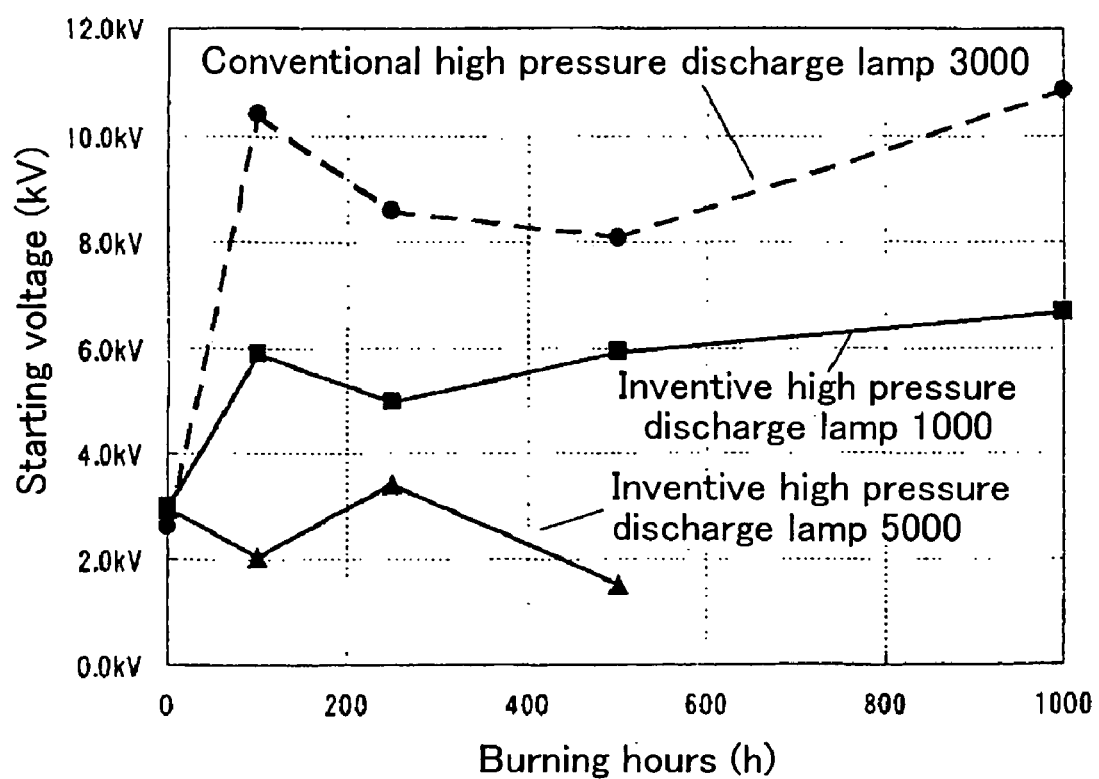
FIG. 6 is a graph showing the relation between the starting voltage and the burning time of the high pressure discharge lamp 5000.

FIG. 6 shows the result obtained by measuring the starting voltage of the high pressure discharge lamp 5000 using the same method as the first embodiment. For reference, the results obtained by measuring the starting voltages of the high pressure discharge lamps 1000 and 3000 are also shown in FIG. 6. For each of the high pressure discharge lamps, ten lamps were measured and the results are represented as the average value of the starting voltages of the ten lamps. From the results shown in this figure, it is found that the high pressure discharge lamp 5000 with the above-described structure, that is to say, the lamp 5000 with the two trigger wires 501a and 501b can start operation at a starting voltage 1 to 2 kV lower than that of the high pressure discharge lamp 1000 with one trigger wire 105. All the ten high pressure discharge lamps 5000 had starting voltages of 10 kV or smaller during the burning tests.

If a lamp can operate at a starting voltage of 10 kV or smaller after burning even in consideration of lamp variations resulting from the production, that lamp is of great value as a high pressure discharge lamp. The reason for this is as follows. If the starting voltage is 10 kV or smaller, connectors and interconnect wires currently used in general for connecting the high pressure discharge lamp to a ballast circuit can be changed to smaller, more lightweight, and lower-cost ones. Therefore, an apparatus including such a lamp and other parts can also be made small and lightweight with a low cost. All the high pressure discharge lamps 5000 of the second embodiment have starting voltages of 10 kV or smaller even though the voltage values include variations. Thus, the lamp of the second embodiment has a significant advantage that the downsizing of the apparatus can be attained.

The setting-up of the trigger wires 501a and 501b may be carried out using a most suitable method according to the application of the lamp.

Also in the lamp of the second embodiment, the presence of the second glass portions 106a and 106b generates, in the side tube portions 109a and 109b, portions to which compressive stresses are applied like the first embodiment. Therefore, the lamp 5000 has a high strength against vapor pressure.

(Third Embodiment)

Figure 7:
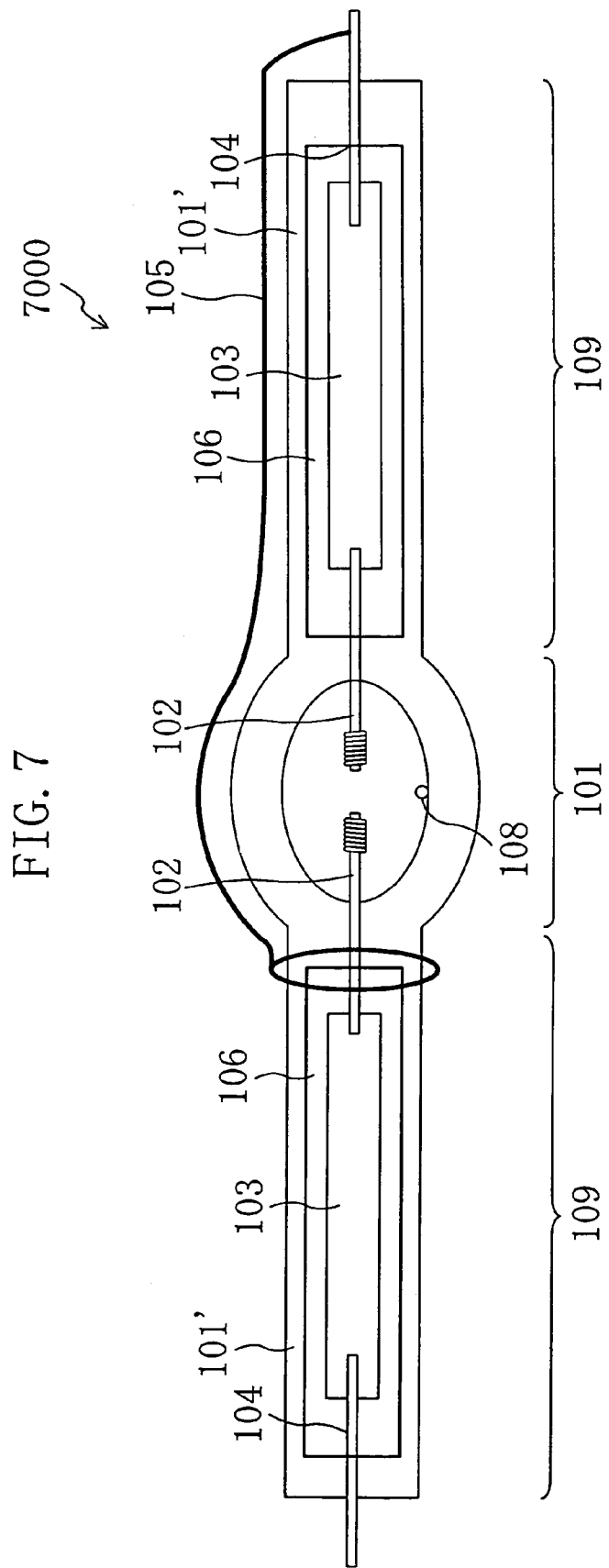
FIG. 7 is a schematic view showing a high pressure mercury lamp 7000 according to a third embodiment.

FIG. 7 is a schematic view of a high pressure discharge lamp 7000 according to a third embodiment. The high pressure discharge lamp 7000 differs from the high pressure discharge lamp 1000 of the first embodiment only in that the coil 107 is absent and the metal foil 103 is not etched. In the other points, the high pressure discharge lamp 7000 has the same lamp structure as the high pressure discharge lamp 1000. Therefore, the elements of the high pressure discharge lamp 7000 bear the same reference numerals as those of the high pressure discharge lamp 1000 and their descriptions will be omitted.

Similarly to the first embodiment, mercury 108 is enclosed within the luminous bulb 101. In the case where the high pressure discharge lamp 7000 is operated as an ultra-high pressure discharge lamp, enclosed within the luminous bulb 101 are, for example, about 200 $mg/cm^3$ or more (220 $mg/cm^3$ or more, 230 $mg/cm^3$ or more, or 250 $mg/cm^3$ or more), preferably about 300 $mg/cm^3$ or more (e.g., 300 to 500 $mg/cm^3$) of mercury, rare gas (e.g., argon) and, if necessary, a small amount of halogen.

In the third embodiment, a coil is not wound around a portion of the electrode 102 embedded in the side tube portion 109 and a tip of the metal foil 103 is not subjected to etching treatment. Therefore, the strength of the lamp against vapor pressure is improved less than those of the first and second embodiments. However, the lamp strength against vapor pressure can be improved more than the conventional high pressure discharge lamp with no second glass portion 106 and no portion to which a compressive stress is applied. Moreover, since the second glass portion 106 contains Na, the same effect as the first embodiment can be exerted on the starting capability of the lamp.

(Other Embodiments)

Each of the embodiments described above is practicable even for a mercury-free high pressure discharge lamp which does not contain mercury (a lamp using halide as luminous substance).

Furthermore, a correlation has been found to exist between the pulse width and the starting voltage of the lamp. If the pulse width is made wider (longer in time), the starting voltage decreases. To be more specific, if the width of the staring pulse used in each of the above-described embodiments was made narrower, a trend was seen in which the starting voltage rises. On the contrary, if the pulse width was made wider, a trend was seen in which the starting voltage decreases to some extent. From these results, it can be considered that in order to set the starting voltage at 10 kV or lower, the pulse width is preferably wider than those of the above-described embodiment.

As described above, a high pressure discharge lamp provided with a trigger wire wound around a side tube portion has the structure in which the side tube portion has a first glass portion extending from a luminous bulb and a second glass portion provided in at least a portion of the inside of the first glass portion, the second glass portion contains at least one substance of Li, Na, and K of from 0.001 wt % to 1.0 wt % inclusive, a metal foil electrically connecting an external lead to an electrode is embedded in the side tube portion, at least a portion of the metal foil is covered with the second glass portion, and the side tube portion includes a portion to which a compressive stress is applied. This structure provides a high pressure discharge lamp operable with a drastically reduced starting voltage and allows a ballast circuit for the lamp to be made small and lightweight with a reduced cost. In addition, this structure improves the safety against a high voltage applied from the ballast circuit and enables application of an insulating member of a simpler structure used in a lead-in line or the like to the lamp. Therefore, a lower-cost light source assembly (e.g., a projector) can be fabricated. Moreover, this structure reduces noises affecting other electric circuits and the occurrence of malfunction. This structure also improves the lamp strength against vapor pressure.

What is claimed is:

1. A high pressure discharge lamp comprising:
    a luminous bulb with a luminous substance enclosed therein;
    a side tube portion for retaining the airtightness of the luminous bulb; and
    a trigger wire wound around the side tube portion,
    wherein the side tube portion includes a first glass portion extending from the luminous bulb and a second glass portion distinct from said side tube portion and provided in at least a portion of the inside of the first glass portion,
    in the second glass portion, at least one selected from the group consisting of Li, Na, and K is contained in an amount of from 0.001 wt % to 1.0 wt % inclusive,
    within the luminous bulb, a pair of electrodes are opposed to each other,
    each of the pair of electrodes is electrically connected to a metal foil,
    the metal foil is embedded in the side tube portion and at least a portion of the metal foil is covered with the second glass portion, and
    the side tube portion includes a portion to which a compressive stress is applied.

2. The lamp of claim 1, wherein when the side tube portion is measured by a sensitive color plate method utilizing the photoelastic effect, the compressive stress applied to a region of the lamp corresponding to the second glass portion is from 10 kgf/cm$^2$ to 50 kgf/cm$^2$ inclusive.

3. The lamp of claim 1,
    wherein a portion of the electrode is embedded in the side tube portion, and
    a coil made of metal is wound around at least part of the portion of the electrode embedded in the side tube portion.

4. The lamp of claim 1,
    wherein the side tube portion comprises a pair of side tube portions,
    the metal foil connected to each of the pair of electrodes is embedded in a corresponding one of the pair of side tube portions,
    the trigger wire includes first and second trigger wires,
    the first trigger wire is electrically connected to one of the electrodes and wound around the side tube portion within which the other of the electrodes is disposed, and
    the second trigger wire is electrically connected to the said other electrode and wound around the side tube portion within which the said one electrode is disposed.

5. The lamp of claim 1,
    wherein mercury as the luminous substance and bromine are enclosed within the luminous bulb, and
    the amount of the enclosed bromine is from $10^{-4}$ μmol/cm$^3$ to 10 μmol/cm$^3$ inclusive in terms of the internal volume of the luminous bulb.

6. The lamp of claim 1,
    wherein the first glass portion contains 99 wt % or more of SiO$_2$, and
    the second glass portion contains less than 99 wt % of SiO$_2$ and at least one of 15 wt % or less of Al$_2$O$_3$ and 4 wt % or less of B$_2$O$_3$.

7. The lamp of claim 1, wherein the second glass portion has a lower softening point than the first glass portion.

8. The lamp of claim 1, wherein an end of the metal foil closer to the luminous bulb is etched.

9. The lamp of claim 1,
    wherein mercury is enclosed as the luminous substance, and
    the amount of the enclosed mercury is 160 mg/cm$^3$ or more in terms of the internal volume of the luminous bulb.

10. The lamp of claim 1,
    wherein mercury is enclosed as the luminous substance, and
    the amount of the enclosed mercury is 300 mg/cm$^3$ or more in terms of the internal volume of the luminous bulb.

* * * * *